Dec. 11, 1962    I. E. WILLIAMS    3,067,884
TRANSFER MISSILE HANDLING CART
Filed July 27, 1961    8 Sheets-Sheet 7
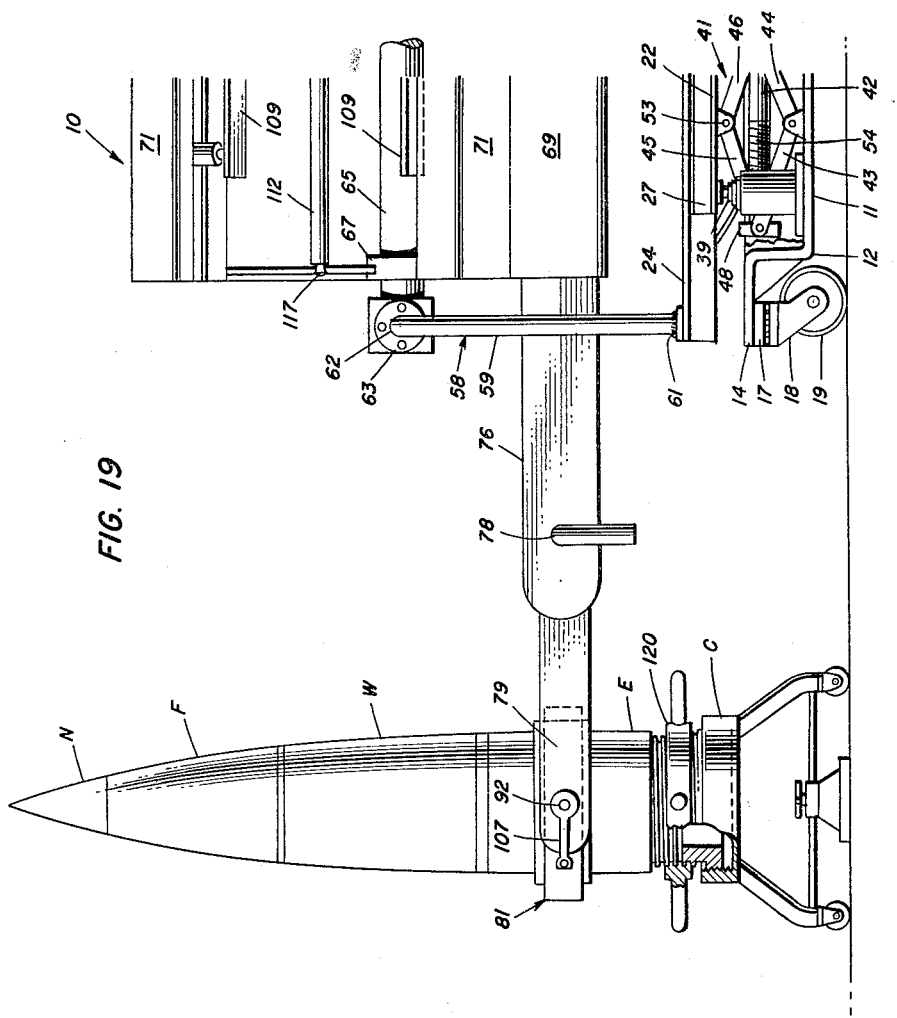

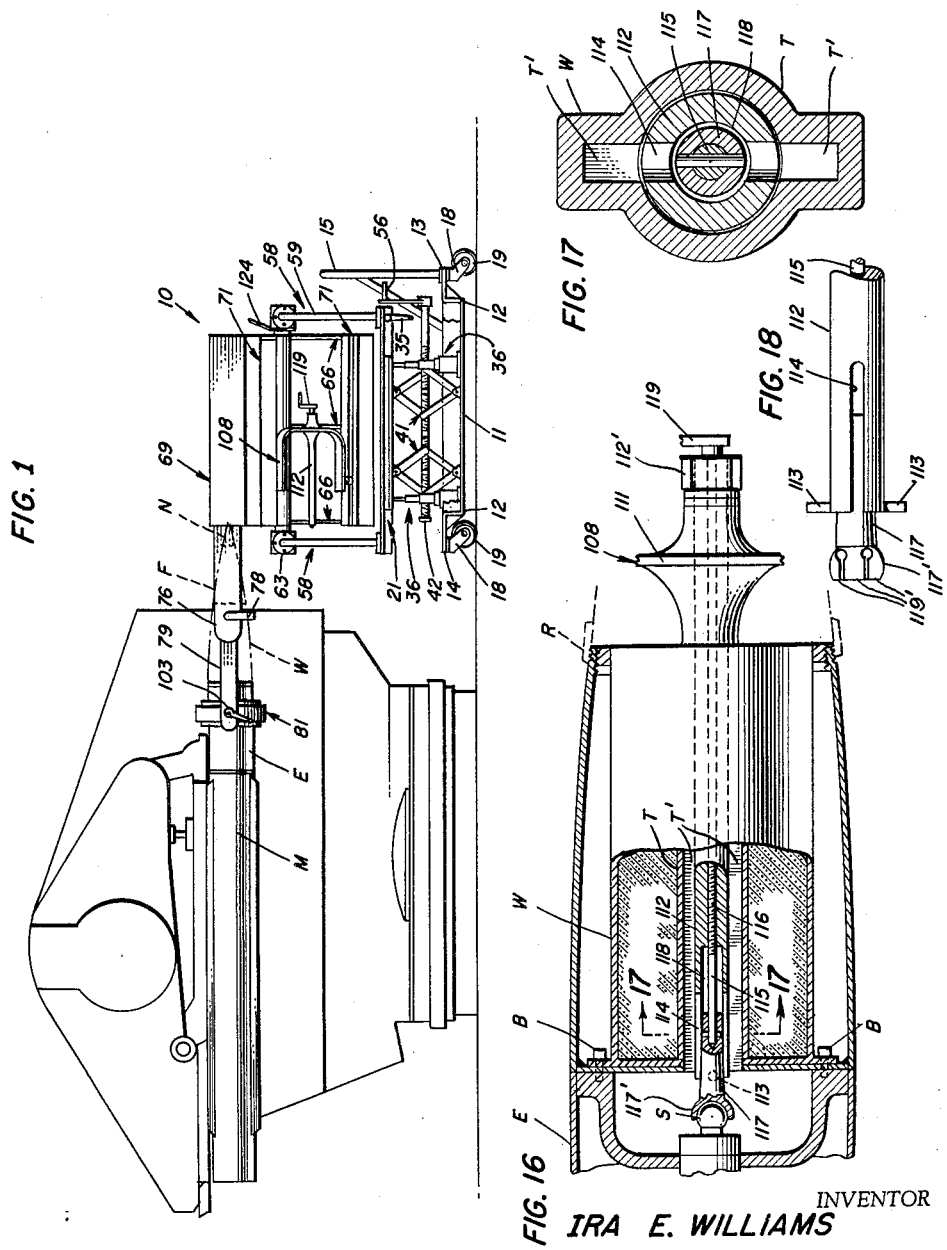

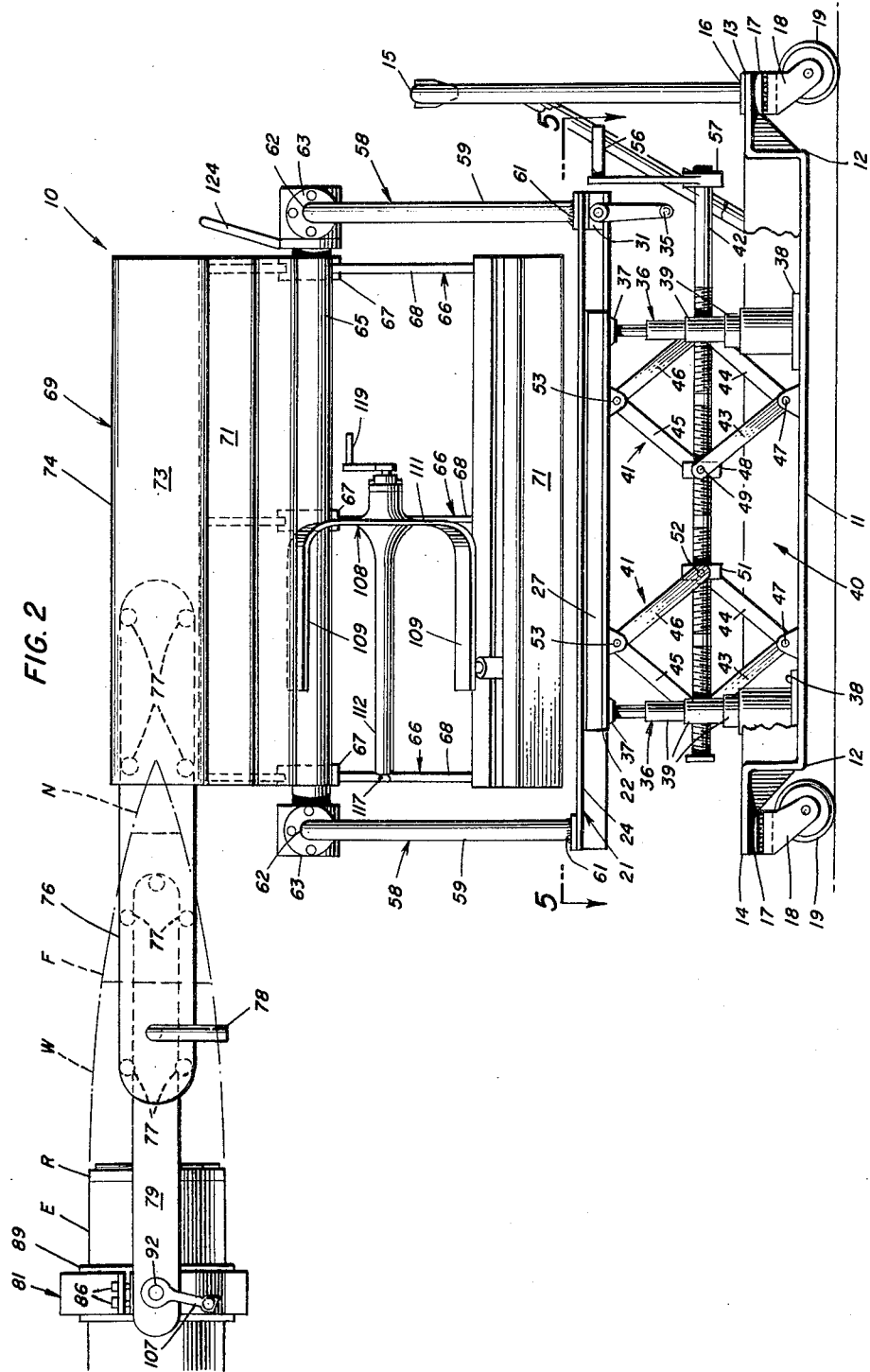

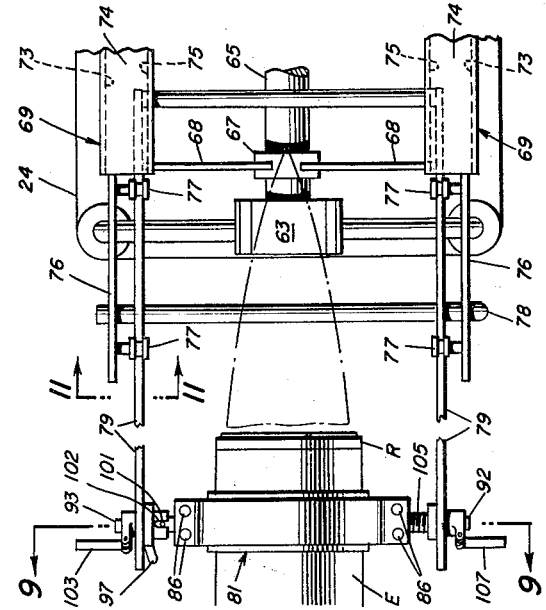
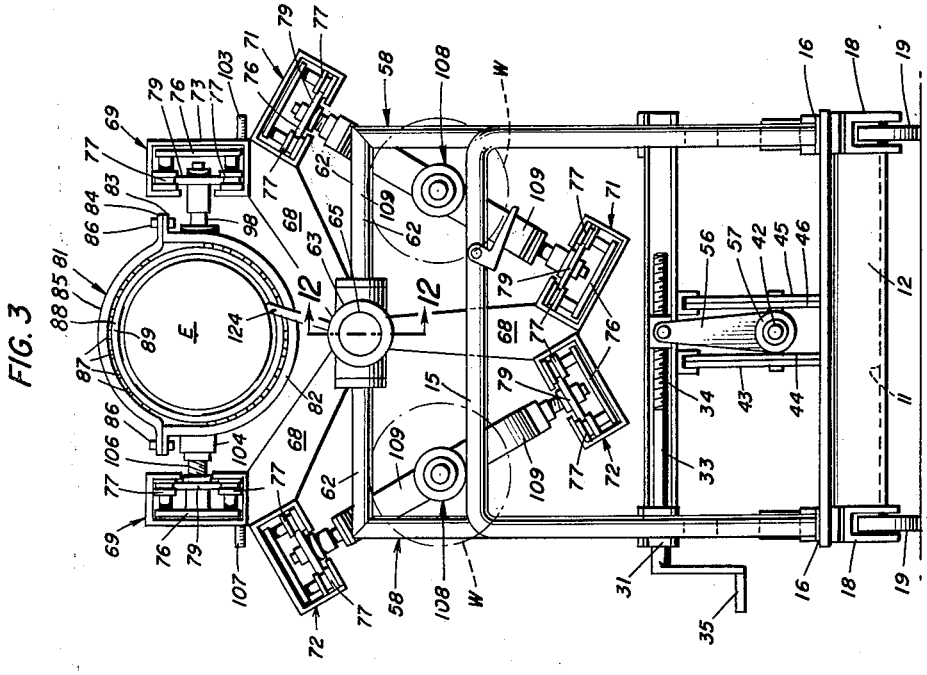

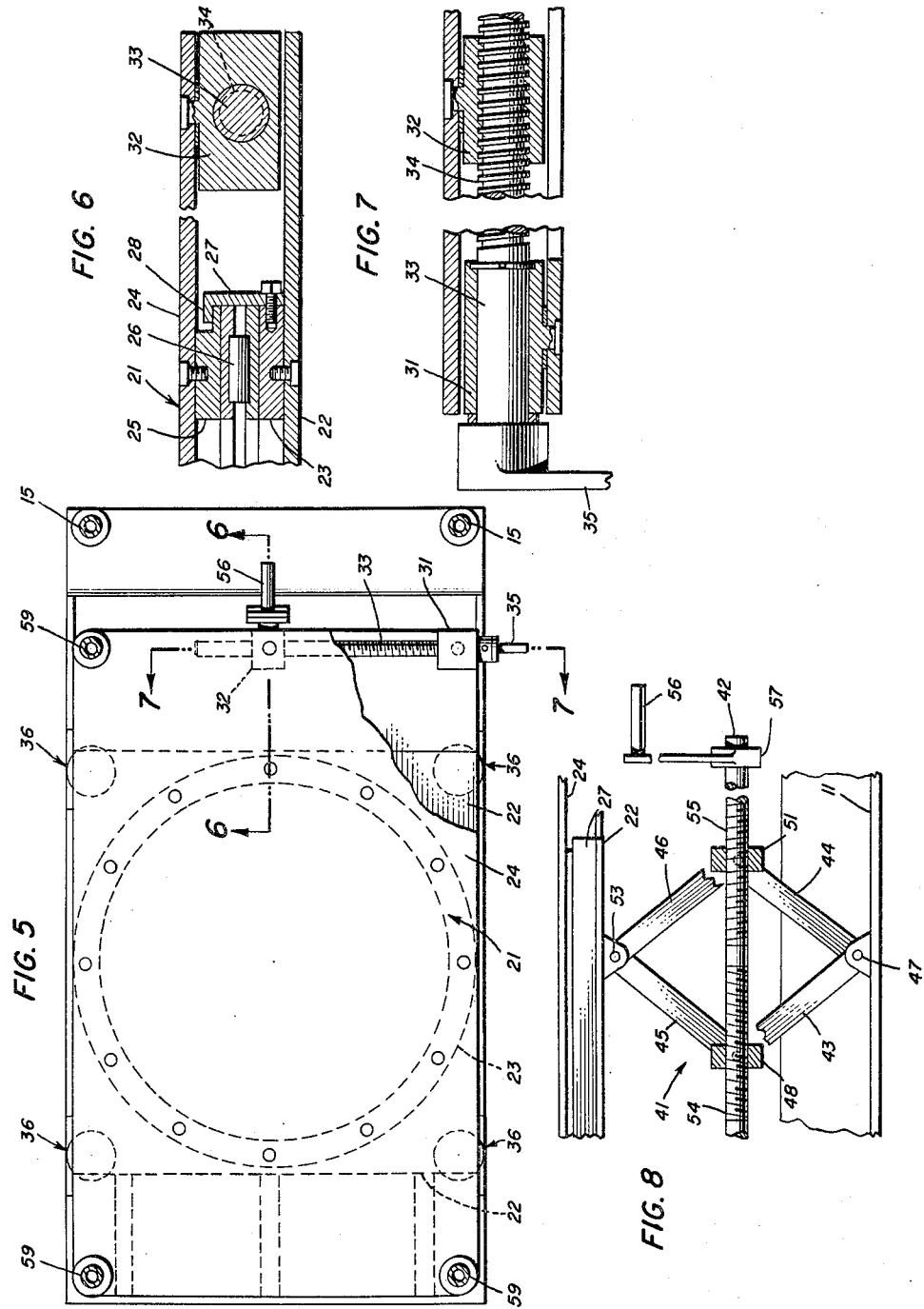

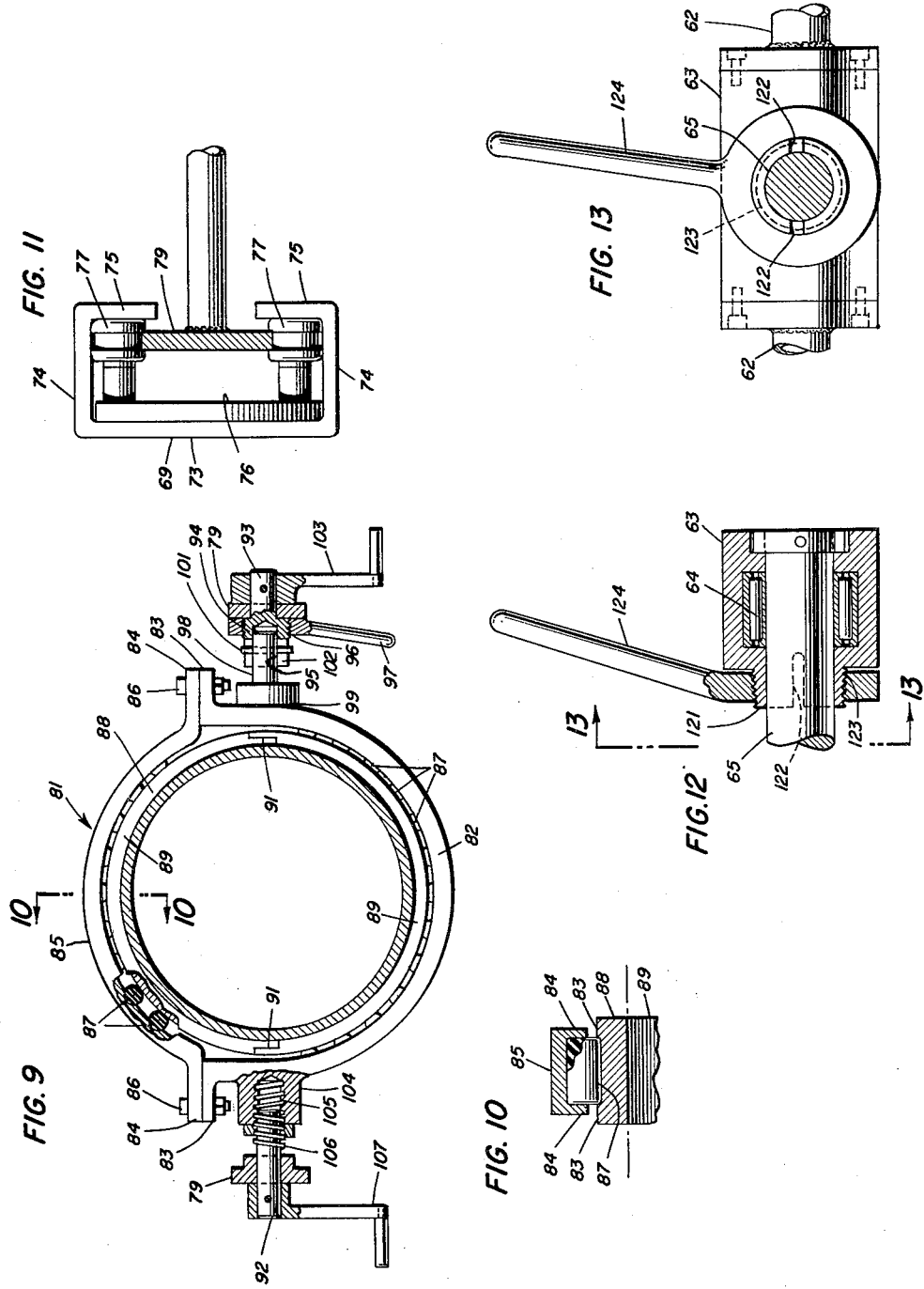

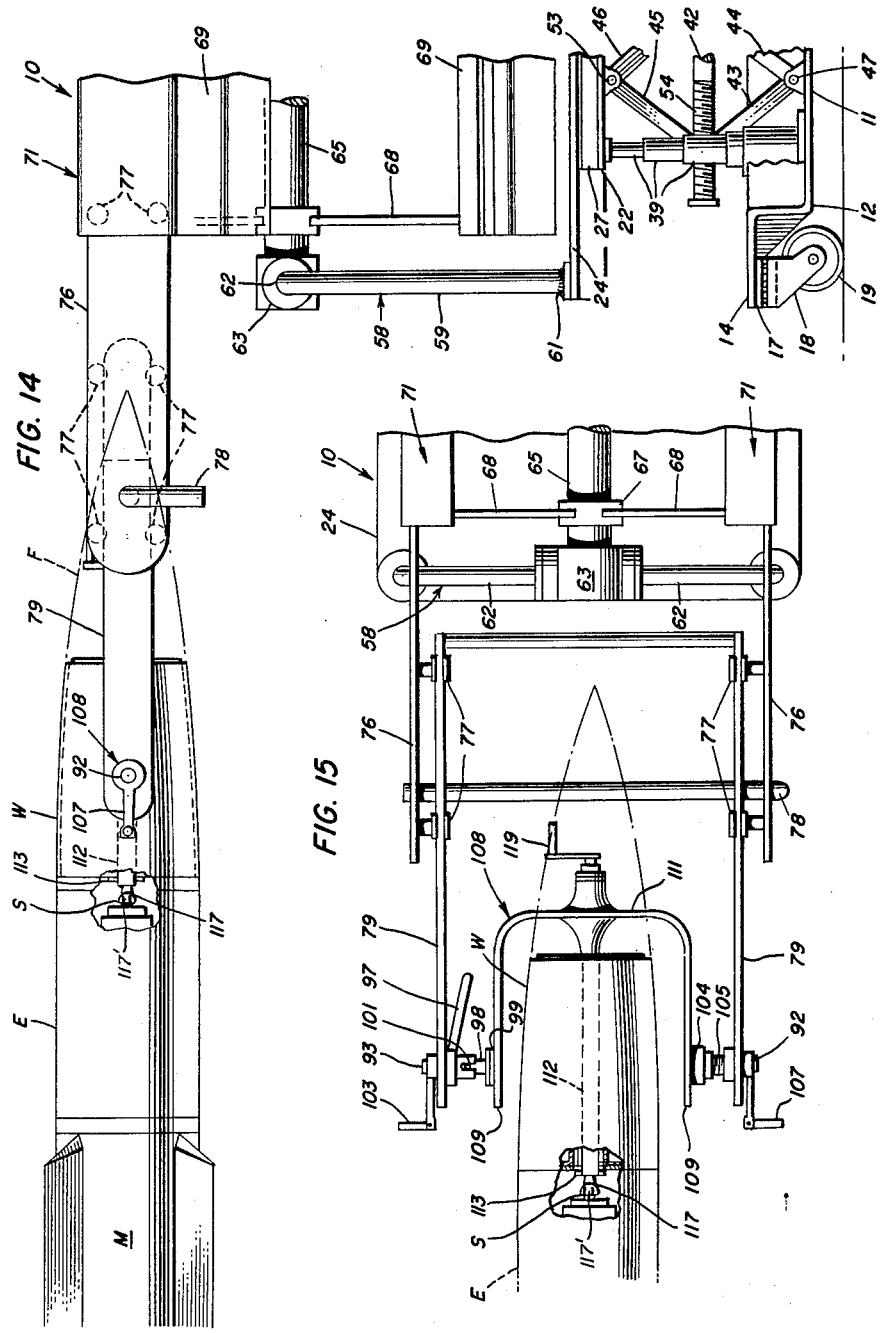

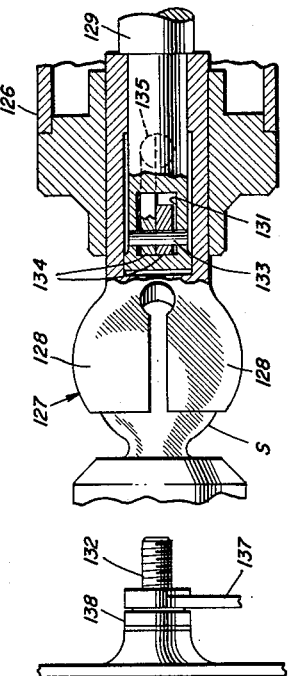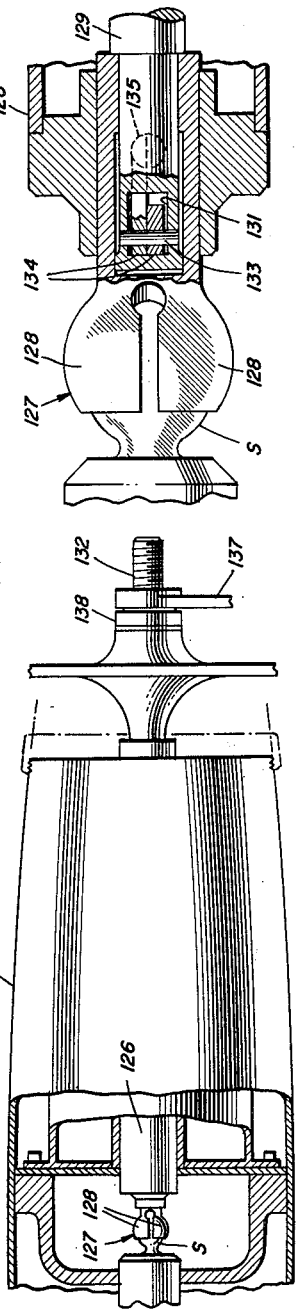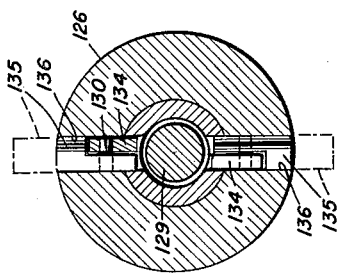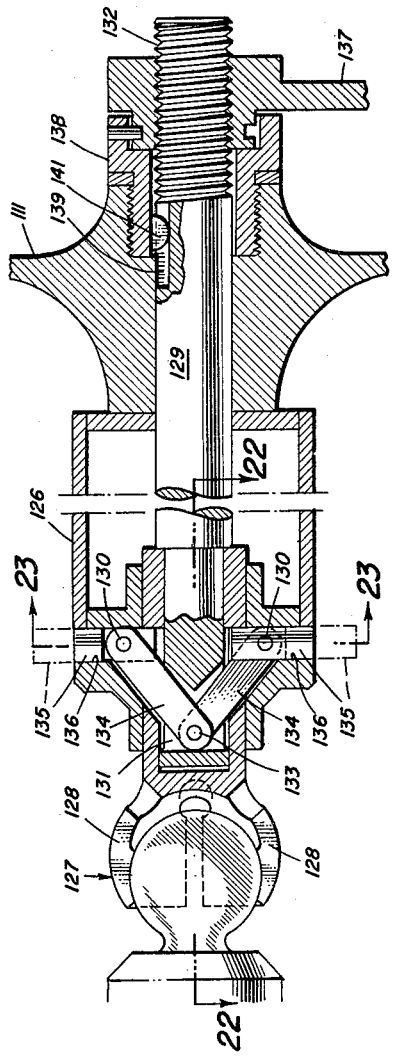

United States Patent Office 3,067,884
Patented Dec. 11, 1962

3,067,884
TRANSFER MISSILE HANDLING CART
Ira E. Williams, Washington, D.C., assignor to the United States of America as represented by the Secretary of the Navy
Filed July 27, 1961, Ser. No. 128,341
24 Claims. (Cl. 214—1)
(Granted under Title 35, U.S. Code (1952), sec. 266)

The invention described herein may be manufactured and used by or for the Government of the United States of America for governmental purposes without the payment of any royalties thereon or therefor.

The present invention relates to mobile carts or dollies and more particularly to an ordnance handling vehicle for transporting and supporting missile sections or components during a section replacement operation.

The invention contemplates the use of a handling vehicle or cart wherein means are provided for supporting a missile component or section during removal of the section from the missile body or during replacement of a test head or section thereon, as the case may be. The invention further provides a handling cart or vehicle wherein adjustable means are employed to position the missile component supports in proper alignment with the missile body located and maintained on a conventional rotatable launching arm, whereupon its electronics section is removed, its warhead is removed, another warhead is installed, and its electronics section is re-installed without moving the cart or vehicle. The cart may be used also for depositing the conventional electronic section on or removing it from a conventional check-out stand and for removing either an electronic section warhead or test head from their respective containers for transportation and attachment to the missile body.

Accordingly, it is an object of the present invention to provide a new and improved vehicle or cart for hauling missile sections or components.

Another object of the present invention is to provide a handling vehicle which will permit a missile section or component to be translated along a surface and controllably elevated to a selected height to position the section in proper relationship with respect to the missile when the missile is positioned on the rotatable launching arm of a missile launcher.

Another object of the invention is to provide an improved handling device which will permit a missile section to be adjustably and detachably supported.

A further object of the invention is to provide an improved missile component handling cart which will permit the component to be elevated to a desired height, rotated about a vertical and transverse axis and adjusted along the transverse axis thereof.

A further object of the invention is to provide an improved missile component handling cart which will permit rotation of the component about the longitudinal axis thereof and movement therealong to facilitate removal of the component from the missile body or placement of the component thereon.

A still further object of the invention is to provide a missile component handling cart wherein a plurality of longitudinally movable component supports are rotatably mounted on a turntable.

A still further object of the invention is the provision of a handling cart for removing or replacing missile sections or components and for transferring the components to an area provided for check-out or stowage of the components.

Other objects and many of the attendant advantages of this invention will be readily appreciated as the same becomes better understood by reference to the following detailed description when considered in connection with the accompanying drawings wherein:

FIG. 1 is a slide elevational view of the dolly constructed in accordance with the present invention and illustrating the dolly and a missile launcher in position during a missile component replacement operation;

FIG. 2 is a view in side elevation of the dolly or cart of the present invention;

FIG. 3 is an end view of the cart of FIG. 2;

FIG. 4 is a fragmentary top plan view of the extensible arms and the adjustable missile component adapter carried thereby;

FIG. 5 is an enlarged sectional view taken substantially on the line 5—5 of FIG. 2, illustraing the turntable arrangement upon which the missile adapters are rotatably and adjustably mounted;

FIG. 6 is an enlarged fragmentary sectional view taken substantially along the line 6—6 of FIG. 5, illustrating the turntable structure;

FIG. 7 is an enlarged fragmentary sectional view taken substantially along the line 7—7 of FIG. 5, illustrating the rotating mechanism;

FIG. 8 is a view partially in elevation and partially in section, illustrating the mechanism for raising and lowering the turntable and means supported thereon;

FIG. 9 is an enlarged sectional view taken substantially along the line 9—9 of FIG. 4, illustrating an adapter suitable for use in handling the electronic section of a missile;

FIG. 10 is an enlarged sectional view taken substantially along the line 10—10 of FIG. 9;

FIG. 11 is an enlarged fragmentary sectional view taken on the line 11—11 of FIG. 4, illustrating the extensible arms and the supporting structure therefor;

FIG. 12 is an enlarged fragmentary sectional view taken along the line 12—12 of FIG. 3, illustrating the locking structure for locking the spider carrying shaft in a desired position;

FIG. 13 is a sectional view taken substantially along the line 13—13 of FIG. 12;

FIG. 14 is a fragmentary side elevational view of the cart of FIG. 2, illustrating the extensible arms supporting an adapter suitable for use during a warhead transfer operation;

FIG. 15 is a plan view of the arrangement of FIG. 14;

FIG. 16 is an enlarged view partially in elevation and partially in section illustrating a warhead supported on the warhead adapter;

FIG. 17 is a cross sectional view taken substantially along the line 17—17 of FIG. 16;

FIG. 18 is an enlarged fragmentary view of the holding and centering arrangement for aligning and holding the warhead during a transfer operation;

FIG. 19 is a fragmentary elevational view of the cart of FIG. 1, illustrating an arrangement whereby the electronic section of a missile may be handled for delivery and for removal to and/or from a conventional checked-out stand.

FIG. 20 is a view similar to FIG. 16 illustrating an alternate arrangement of the warhead adapter;

FIG. 21 is an enlarged sectional view of the mandrel arrangement of FIG. 16;

FIG. 22 is a sectional view taken substantially on the line 22—22 of FIG. 21; and FIG. 23 is sectional view taken substantially on the line 23—23 of FIG. 21.

Referring now to the drawings wherein like reference numerals designate like parts throughout the several views, and more particularly to FIG. 1, the numeral 10 generally indicates a mobile cart constructed in accordance with the present invention. The cart 10 comprises a base plate or member 11, composed of any material suitable for the purpose and offset at opposite ends, as at 12 to provide extensions or supports 13 and 14. A U-shaped push bar or handle 15 is mounted on the support 13 in any suitable manner such, for example, as by having the free ends or legs thereof welded thereto, as at 16. Each of the supports 13 and 14 is provided with a caster mount 17 near the outermost portions thereof, as best shown on FIG. 2.

Mounted for pivotal movement about the caster mount 17 is a caster unit 18 including a caster wheel 19, the wheel being controlled by a "dead-man" type braking mechanism such, for example, as the type disclosed and claimed in the copending application of Harry S. Cook, Serial No. 32,055, filed May 26, 1960, for caster wheel brake mechanism.

A turntable assembly generally indicated by the numeral 21 is adjustably mounted on the base plate 11 and comprises a bearing plate or member 22 having secured thereto in any suitable manner a circular disc 23. Disposed above the member 22 and in spaced relation with respect thereto is a support or plate 24 having secured thereto a disc 25 similar to the disc 23 and cooperating therewith. The discs 23 and 25 at the innermost surfaces thereof being in spaced relationship and having suitable anti-friction bearings 26 disposed therebetween. As is more clearly shown on FIG. 6, the axes 23 and 25 are maintained in position by a bearing ring or retaining member 27 carried by the disc 23 and having a flange 28 in engagement with disc 25. The plate is provided with a journal member 31 pivotally mounted thereon. The plate 24 on the underside thereof is provided with a lug or block 32 pivotally mounted thereon and having a threaded bore extending therethrough. An actuating shaft 33 is journaled in member 31 with the free end thereof threaded as at 34 and in engagement with threaded bore in lug 32, the shaft being provided with crank or actuating member 35, FIGS. 5 and 7. By this arrangement the plate or support 24 is mounted for rotatable movement in either direction.

A guide member generally indicated by the reference numeral 36 is located at each corner of the bearing plate 22 and disposed between plate 22 and base 11, each guide member being secured to plate 22, as at 37 and to base 11, as at 38 and including a plurality of telescoping elements 39.

It will be noted from an inspection of FIGS. 1, 2, and 8 that the cart is further provided with an elevating mechanism generally indicated by the reference character 40, comprising a pair of mutually spaced linkages 41 and an actuating shaft or member 42. Each of the linkages 41 include links 43 and 44 and links 45 and 46. One end of links 43 and 44 are pivotally connected to base 11, as at 47, the other end of link 43 being pivotally connected to a collar 48, as at 49, and the other end of link 44 being pivotally connected to a similar collar 51, as at 52. One end of links 45 and 46 is pivotally connected to bearing plate 22, as at 53, the other end of link 45 being pivotally connected to the collar 48 in like manner as link 43, and the other end of link 46 being pivotally connected to collar 51 in like manner as link 44. The aforesaid collars 48 and 51 are threaded in a reverse direction and threadably engage cooperating portions 54 and 55 on shaft 42 and thus by this arrangement the turntable assembly may be raised or lowered according to the rotation of the shaft 42 by means of the crank 56 mounted on one end thereof. The crank 56 may be provided with a conventional ratchet head 57 for engagement with complementary means on the shaft 42 whereby the shaft may be rotated in the desired direction.

As is more clearly shown on FIG. 2 and 3, a U-shaped support 58 is mounted on opposite ends of the plate 24, the terminal legs 59 thereof being secured to the plate 24 in any suitable manner such, for example, as by welding the legs thereto, as at 61. The upper or transverse bar 62 of U-shaped members 58 connecting the legs thereof are provided with centrally disposed bearings or housings 63 having radial thrust anti-friction bearings 64, FIG. 12, carried thereby and rotatably supporting a shaft 65.

It will be noted by reference to FIGS. 1, 2 and 3 that the shaft 65 carries a plurality of mutually spaced spiders generally indicated by the numeral 66, each spider comprising a hub 67 mounted on shaft 65 and having a plurality of arms 68 carried thereby and extending radially therefrom, as best shown on FIG. 3. The arms 68 are provided with pairs of complementary channel members 69, 71 and 72, disposed at the terminal ends thereof and secured thereto in any suitable manner such, for example, as welding the parts together. Each of the channel members is identical in structure and includes outer side walls 73, end walls 74 connecting the side walls to inner flange members 75. An extension or adjustable arm 76 is slidably disposed within each of the channel members and carries a plurality of grooved rollers 77 in rolling engagement with flanges 74, the arm 76 in each of the channel members being connected or bridged by a tie rod 78. Disposed between and riding on the rollers 77 on each arm 76 is an additional extension or adjustable arm 79, the purpose of which will become more clearly apparent as the description proceeds. By the aforesaid channel arrangement it will be understood that the arms 76 and 79 may be adjusted to any desired position with respect to a missile component during a handling operation.

An adapter generally indicated by the reference character 81, FIG. 9, is disposed between the adjustable arms 79 associated with channels 69 and movably mounted thereon. The adapter comprises a substantially U-shaped member 82 in the form of a relatively narrow band having flanges 83 extending outwardly therefrom in registration with complementary flanges 84 formed on a cap 85 and secured together by bolts or the like 86. The U-shaped member 82 and the cap 85 are each provided with a plurality of mutually spaced circumferential rollers 87 composed preferably of rubber and in engagement with a securing chock or holding element 88. The element 88 is disposed within the U-shaped and cap members and comprises a pair of semi-circular elements 89 detachably secured together, as at 91.

The adapted 81 is movably supported between the arms 79 by stub shafts 92 and 93, shaft 92 being journaled in one arm 79 and shaft 93 being journaled in the other arm 79. Shaft 93 is provided with a bearing or socket member 94 having a bore 95 and threaded, as at 96, in threaded engagement with a locking lever 97 for locking the shaft against rotation. A shaft 98 is secured to the member 82 at one side thereof, as at 79, and journaled in the bore 95, the shaft being provided with a pin 101 disposed within slots 103 formed in socket 94 thereby to provide a driving connection between shafts 93 and 98. A suitable crank or handle 103 is secured to the outermost end of the shaft 93 for imparting rotary movement thereto which movement is transmitted to shaft 98 by reason of the aforesaid driving connection between shafts 93 and 98. Still referring to FIG. 9, a boss or socket member 104 is carried by the member 82 at the other side thereof, the member 104 being provided with a centrally disposed bore 105 in threaded engagement with the shaft 92, as at 106. The shaft 92 is actuated by a handle or crank 107 secured thereto at the outermost end thereof to facilitate transverse adjustment of the adapted 81, if desired.

It will be understood that each pair of channels 71 and 72, are provided with the aforementioned extension arm arrangement, the arms 79 thereof being adapted to support the aforesaid electronic adapter 81 or a pair of U-shaped warhead adapters generally indicated by the numeral 108, FIGS. 14 through 18. The adapters 108 are identical in structure, each adapter comprising a pair of mutually spaced legs 109 which are connected at one end thereof by a member or cross bar 111. The adapters 108 are rotatably and adjustably supported in the same manner and by the same structure as the adapter 81 which structure has been clearly set forth heretofore and which will facilitate rotary and transverse adjustment of the warhead adapters. Each adapter 108 is provided with a mandrel 112 carried by the member 111 and having stops 113 disposed at one end thereof and extending outwardly therefrom, the aforesaid end of member 112 being further provided with a plurality of slots 114. The member 112 is adapted to be inserted into the centrally disposed tube T of the warhead with stops 113 in a position to pass through the slots T' provided therein. When the member 112 has been inserted into the tube T a predetermined amount rotation thereof positions the stops 113 so that they engage the warhead, whereupon a nut 112' in threaded engagement with the outermost end of member 112 and abutting engagement with member 111 maintains the stops 113 in engagement with the warhead. A shaft 115 is disposed within and extends centrally through the member 112 and has a portion threaded, as at 116, for engagement with the member 112, FIG. 16. The shaft 115 is provided at one end thereof with an expander 117 operable in a bore 118 and at the slotted end of the mandrel 112. The expander is provided with a socket member 117' having a plurality of resilient fingers 119', as best shown in FIG. 18. The other end of shaft 115 has a crank 119 secured thereto for moving the expander 117 an amount sufficiently to forcibly move the socket over and into clamping engagement with the conventional centering sphere S fixed to the missile M, the stop 113 being maintained in engagement with the warhead by the aforesaid nut 112', FIG. 16. Thus, by this arrangement the warhead is securely held in place during a warhead transfer or replacement operation.

It will be noted on FIGS. 20 through 23 that an alternate arrangement of the mandrel illustrated. In this arrangement the mandrel comprises a tubular member 126 carried by the member 111 and having socket 127 secured thereto at one end thereof, the socket being provided with a plurality of resilient fingers 128 and in like manner to socket 117', socket 127 cooperates with the sphere S on the missile during a transfer or replacement operation. A shaft 129 is slidably supported within the tubular member 126 and has a slot 131 formed therein at one end and a threaded portion 132 at the other end thereof.

Disposed within the slot 131 in shaft 129 and pivotally connected at one end thereof to the shaft, as at 133, is a pair of links 134, the other end of each link being pivotally connected to a stop 135, as at 130, each stop being slidably disposed within a complementary slot 136 formed in the tubular member 126, the stops being adapted to engage the warhead in like manner to stops 113.

A crank 137 is rotatably mounted in a bearing 138 carried by member 111 and threadedly engages the portion 132 on the shaft 129 and thus upon rotation of the crank to shaft is moved slidably within the tubular member 126 since rotation thereof is prevented by a keyway 139 formed in the shaft 129 and a key 141 carried by bearing 138. By the aforesaid arrangement and upon rotation of the crank 137 in one direction the shaft may be moved an amount sufficiently to cause the links to extend the stop 135 into engagement with the warhead and upon rotation of the crank in a reverse direction the shaft may be moved an amount sufficiently to cause the links to retract the stops, whereupon the stops move out of engagement with the warhead.

It will be noted in FIGS. 12 and 13 that one of the housings 63 is provided with a tapered boss 121 having oppositely disposed slots 122 formed therein and threaded, as at 123. A locking handle or lever 124 is mounted on the boss 121 in threaded engagement therewith for locking the shaft 65 in a predetermined position during a replacement operation such, for example, as when replacing a warhead with a test head or when replacing an electronic section with a checked-out electronics section, as the case may be.

As shown in FIG. 1, the dolly is in a position to either remove a conventional section from the missile body M or attach the section thereto, the section consisting of the usual components such, for example, as the electronic section E, warhead W, fuze section F and nose section N. It will be understood that when the cart or dolly is in the position as shown in FIG. 1, the casters 18 are in a locked condition, the casters being locked by the aforementioned "dead-man" type locking or braking mechanism, the adapter 81 being clamped about the E section in such a manner as not to apply concentrated forces on the delicate components contained therein and the arms 76 and 79 being in an extended position, as shown in FIGS. 1, 2 and 4. During the attachment of the aforesaid section to the missile body M the turntable assembly 21, including the bearing plate 22 and support 24, are raised to the desired position by the elevating mechanism 40. The spider shaft 65 is rotated and the E section is rotated about its long axis so that the indexing key on the E section aligns with the indexing keyway on the body M.

Further adjustment may be made, if desired, by the actuating cranks 103 and 107 to facilitate final and proper alignment of the section on the missile body. It will be apparent that during attachment of the section to the body, the usual spanner wrench is used on the conventional ring R so that the section and body are securely locked together, the spanner wrench also being used to unlock the section and body when the section is to be detached therefrom. When the aforesaid section is detached from the body M it may be delivered to the conventional checked-out stand C and secured thereto by a suitable coupling collar 120, FIG. 19, or, if desired, the aforesaid section may be removed from the check-out stand C and attached to the body M in the aforesaid manner, the adapter 81 being employed to support the section during removal and transportation thereof from the body M to the checked-out stand C. By the aforesaid arrangement the conventional section may be removed from the body M and replaced with a checked-out section while the body M is being held on the launcher arm in the conventional manner.

As shown in FIGS. 14, 15 and 16 the cart is used during removal of a warhead W from the body M so that a test head may be substituted for a warhead, the warhead adapter 108 being employed during this operation. It will be understood that the warhead adapter 108 is moved in proper relationship with respect to the body M during a replacement operation in like manner to the operation described in connection with the adapter 81. In this arrangement, however, the actuating shaft 115 disposed within mandrel 112 is moved an amount by crank 119 to move the socket 117' at the terminal end of the expander 117 so that the resilient fingers 119' thereon move about and grippingly engage the conventional centering sphere S fixed to the missile with the stop 113 on the mandrel in engagement with the bottom wall of the warhead, and the nut 112' in abutting engagement with member 111, as best shown on FIG. 16. By this arrangement the warhead is securely held in place, whereupon a suitable wrench such, for example, as a socket wrench may be employed to either remove or replace the bolts B thereby to detach and/or replace the warhead on a test head on the body M, as the case may be.

In the mandrel arrangement of FIG. 21, the socket on the end of member 126 is forcibly moved over the aforesaid sphere S on the missile and the resilient finger 128 thereof grippingly engages the sphere. Thereafter, the shaft 129 is slidably moved by the rotation of crank 137 in one direction an amount sufficiently to cause the links to move the stops 135 into a position to engage the warhead, as shown in dashed-outline, FIGS. 21 and 23. By this arrangement and in like manner to the mandrel arrangement of FIG. 16, the warhead is securely held in place upon the adapter during the removal and/or replacement of the warhead or test head to or from the body M, as the case may be. When the warhead is attached to the body, the crank 137 may be rotated in a reverse direction an amount sufficiently to cause the links 134 to move the stops 135 out of engagement with the warhead, FIGS. 21 and 23. Thereafter, the socket 127 is forcibly removed from the sphere S, whereupon the mandrel may be removed from the warhead.

It will be understood that the adapter 81 and 108 are interchangeable and, if desired, one adapter 81 and two adapters 108 may be employed for one replacement operation or one adapter 108 and two adapters 81 may be employed for another replacement operation, depending upon the specific replacement to be performed, or for that matter, any combination of the aforesaid adapters may be employed.

Moreover, the missile cart of the present invention further provides for rotating either the E section or warhead about vertical and transverse axes to establish parallelism between the center lines of the E section and warhead and the body of the missile held on the launcher arm, traversely thereof along a transverse axis to place the center lines of the body and the E section or warhead in the same vertical plane, vertically thereof to place the center lines of the body and the E section or warhead in the same horizontal plane, rotatably about the longitudinal axis of the E section to align its indexing keys with the keyways on the missile and the adapters may be moved along the longitudinal axis of the E section to facilitate assembly and disassembly of the same to and from the missile body.

Obviously, many modifications and variations of the present invention are possible in the light of the above teachings. It is, therefore, to be understood that within the scope of the appended claims the invention may be practiced otherwise than as specifically described.

What is claimed is:

1. A mobile missile component handling cart comprising a base member, an elevatable support, means including a shaft operatively connected to said support for raising and lowering the support, a supporting plate rotatably mounted on said support and in spaced relationship with respect thereto, means carried by and disposed between the support and supporting plate for rotatably mounting said supporting plate, means operatively connected to said support and supporting plate for imparting rotary movement to the plate, a plurality of spiders rotatably mounted on said supporting plate, a plurality of adapters adjustably mounted on said spiders for supporting missile components, means carried by said spiders and operatively connected to the adapters for adjustably mounting the adapters on the spiders, means carried by said mounting means for moving the adapters to selected positions, and means on the mounting means for maintaining the adapters in said selected positions.

2. A mobile missile component handling cart according to claim 1, including a pair of mutually spaced bearings carried by said supporting plate, a shaft mounted in said bearings and carrying said spiders, means on the shaft for imparting rotary movement thereto to rotate the spiders, and means mounted on one of said pair of bearings and movable into locking engagement with the shaft for locking the shaft against rotation.

3. A mobile missile component handling cart according to claim 1, including a pair of channel members on one end of each of said plurality of spiders for supporting said mounting means for longitudinal movement.

4. A mobile missile component handling cart according to claim 1 wherein said adapters include missile component holding means carried by the adapters for engaging said missile components.

5. A mobile missile component handling cart according to claim 1, wherein said means for imparting rotary movement to said supporting plate includes a shaft rotatably mounted on said support in threaded engagement with said supporting plate and an actuating crank on the shaft.

6. A mobile missile component handling cart according to claim 1, wherein said means for rotatably mounting the supporting plate includes a disc carried by said support, a complementary disc carried by the supporting plate in spaced relationship with the disc on the support, anti-friction bearings disposed between and in engagement with said discs, and a retaining ring carried by the disc on the support and in engagement with the complementary disc for maintaining the complementary disc in engagement with the anti-friction bearings.

7. A mobile missile component handling cart according to claim 1, including controllable caster wheels on said base member, and telescoping guide means disposed between the base member and the support for guiding the support during the raising and the lowering of the support.

8. A mobile missile component handling cart according to claim 1, wherein said raising and lowering means includes a pair of extensible and retractable linkages secured to the base member and the support, a threaded shaft operatively connected to said linkages for extending and retracting said linkages upon rotation of the shaft, and means carried by the shaft for imparting rotary movement thereto.

9. A mobile missile component handling cart comprising a base member supported on casters, an elevatable support connected to said base member, means including linkages pivotally connected to the base member and to the support for raising and lowering said support, a supporting plate rotatably mounted on said support in spaced relationship with respect thereto, means including a disc carried by the support for rotatably mounting said supporting plate on the support, means including a shaft mounted on the support and operatively connected to the supporting plate for imparting rotary movement to the plate, a pair of mutually spaced bearings carried by said supporting plate, a shaft journaled in said bearing, a plurality of spiders mounted on said shaft for rotating therewith, channel means carried by said spiders, extensible means slidably disposed within said channel means, adapter means adjustably supported on said extensible means for supporting missile components in selected positions, means carried by said extensible means and connected to said adapter means for adjustably supporting the adapter means on the extensible means, means operatively connected to said supporting means for moving the adapter means to said selected position, and means carried by said supporting means for locking the adapter means in said selected position.

10. A mobile component handling cart according to claim 9, wherein said adapter means include a substantially U-shaped member and a missile component holding device carried thereby.

11. In a missile cart of the character disclosed, the combination of a missile body and a missile component carried thereby, holding means for holding the missile body as a missile component is removed therefrom and attached thereto, a mobile base member, a support rotatably mounted on said base member, spider means rotatably mounted on said support, interchangeable adapter means for releasably supporting the missile component during removal and attaching operations, means slidably mounted on the spider means and connected to the adapter means for allowing the adapter means and the component to move in a longitudinal direction to facilitate removal of the component from the missile body and the attachment of the component thereto, and means carried by said adapter means for releasably securing the component thereto during said removal and attaching operations.

12. In a missile cart of the character disclosed the combination of a missile body and a missile component, means for holding the missile body as a missile component is removed therefrom and attached thereto, a mobile supporting base, a platform rotatably mounted on said base, spider means rotatably mounted on said platform and movable therewith, guide means carried by said spider means, adapter means for releasably supporting the missile component during removal and attaching operations, means slidably disposed within said guide means and connected to the adapter means for allowing movement of the adapter means and the component in a longitudinal direction to facilitate removal of the component from the missile body and the attachment of the component thereto, and means including a socket element having a plurality of resilient fingers carried by said adapter means for releasably supporting the component during said removal and attaching operations.

13. In a missile cart of the character disclosed, the combination of a missile body and a missile component removable therefrom and attachable thereto, means for holding the missile body during the removal and the attaching operations, a mobile base member, a platform rotatably mounted on said base member, means for rotating said platform in a horizontal plane, spider means mounted on said platform and rotatable about an axis corresponding to the longitudinal axis of said body and movable by and with respect to the movement of the platform, guide means carried by said spider means, adapter means for releasably supporting the missile component during removal and attaching operations, means slidably disposed within said guide means and operatively connected to the adapter means for allowing movement of the adapter and the component in a direction corresponding to the longitudinal axis of the missile body and component, means including a component engagement element carried by said adapter means for releasably holding the component during said removal and attaching operations, and means carried by said slidable means and attached to the adapter means for supporting the adapter means for rotation about an axis at a right angle with respect to the axis of rotation of the spider means and for movement transversely along said axis of rotation at a right angle with respect to the axis of rotation of the spider means.

14. The combination according to claim 13 including means operatively connected to said supporting means for rotating the adapter means about said axis at at right angle with respect to the axis of rotation of said spider means.

15. The combination according to claim 13 including means operatively connected to said supporting means for moving the adapter means transversely along said axis at a right angle with respect to the axis of rotation of the spider means.

16. The combination according to claim 13 including locking means adjustably mounted on said supporting means and movable into locking engagement with said slidable means for locking the supporting means so that the adapter means may be maintained in a desired rotated position.

17. The combination according to claim 13 wherein said supporting means for the adapter means includes a shaft rotatably mounted in said slidable means, a stub shaft carried by the adapter means and supported by and in driving connection with said shaft, an additional shaft rotatably mounted in the slidable means in threaded engagement with the adapter means, means in threaded engagement with the additional shaft and movable into engagement with the adapter means for locking the additional shaft thereto against rotation of the adapter means.

18. The combination according to claim 13 wherein said guide means include substantially U-shaped channel members carried by and rotatable with the spider means.

19. The combination according to claim 13 wherein said slidable means include pairs of extensible arms, rollers carried by one pair of each of said pairs of arms in engagement with the other pair of each of the pairs of arms.

20. A mobile missile component handling cart comprising an elevatable platform, means for raising and lowering said platform, a rotatable support mounted on said platform, means for rotating said support, spider means rotatably mounted on said support for rotation about an axis corresponding to the longitudinal axis of the cart and movable with respect to said support, adjustable supporting means carried by said spider means and movable in a plane corresponding to the axis of rotation thereof, adapter means rotatably and adjustably supported on said supporting means, means for rotating said adapter means about an axis transversely with respect to the axis of rotation of said spider means, and means for moving the adapter means in a plane corresponding to the axis of rotation thereof.

21. A mobile missile component handling cart according to claim 20 wherein said adapter means includes a resilient socket member and a pair of retractable and extensible stop devices.

22. A mobile missile component handling cart according to claim 20 wherein said adapter includes a mandrel having a plurality of resilient fingers mounted at one end thereof, a pair of stops slidably mounted at said one end of the mandrel, and means including a rotatably mounted crank for extending and retracting said stops.

23. A mobile missile component handling cart according to claim 20 wherein said adapter includes a mandrel having a socket member provided with a plurality of resilient fingers mounted at one end thereof, a shaft slidably mounted in said mandrel, a pair of stops slidably mounted in said mandrel at said one end thereof and operatively connected to said shaft, and a crank threadedly mounted on the shaft for extending and retracting said stops as the crank is rotated about and with respect to the shaft.

24. A mobile missile component handling cart according to claim 20 wherein said adapter includes a mandrel having a plurality of resilient fingers at one end thereof, a shaft slidably mounted within said mandrel, a pair of stops slidably mounted in said mandrel, link means pivotally connecting the stops to the shaft for extending and retracting the stops as the shaft is slidably moved within said mandrel, and a crank threadedly mounted on the shaft and rotatably mounted on the adapter for slidably moving said shaft upon rotation of the crank.

References Cited in the file of this patent

UNITED STATES PATENTS

| | | |
|---|---|---|
| 1,981,680 | Tindale | Nov. 20, 1934 |
| 2,395,411 | Kittel | Feb. 26, 1946 |
| 2,468,884 | L'Esperance | May 3, 1949 |
| 2,613,822 | Stanley | Oct. 14, 1952 |
| 2,620,930 | Mullgardt | Dec. 9, 1952 |
| 2,672,243 | Marsh | Mar. 16, 1954 |
| 2,920,773 | Knabe | Jan. 12, 1960 |